United States Patent [19]

Ukihashi et al.

[11] Patent Number: 4,508,603
[45] Date of Patent: Apr. 2, 1985

[54] FLUORINATED CATION EXCHANGE MEMBRANE AND USE THEREOF IN ELECTROLYSIS OF AN ALKALI METAL HALIDE

[75] Inventors: Hiroshi Ukihashi, Tokyo; Tatsuro Asawa, Yokohama; Masaaki Yamabe, Machida; Haruhisa Miyake, Yokohama, all of Japan

[73] Assignee: Asahi Glass Company Ltd., Tokyo, Japan

[21] Appl. No.: 957,453

[22] Filed: Nov. 3, 1978

Related U.S. Application Data

[63] Continuation-in-part of Ser. No. 718,424, Aug. 22, 1976, abandoned.

[51] Int. Cl.³ .................. C25B 1/34; C25B 13/08
[52] U.S. Cl. ..................... 204/98; 204/128; 204/296; 204/252
[58] Field of Search .................. 204/98, 128, 296, 252

[56] References Cited

U.S. PATENT DOCUMENTS 4,065,366 12/1977 Oda et al. .................. 204/296
4,126,588 11/1978 Okihashi et al. .................. 204/296

FOREIGN PATENT DOCUMENTS 2659581 7/1977 Fed. Rep. of Germany ...... 204/296
24176 2/1977 Japan .
1497748 1/1978 United Kingdom .
1497749 1/1978 United Kingdom .

Primary Examiner—R. L. Andrews
Attorney, Agent, or Firm—Oblon, Fisher, Spivak, McClelland & Maier

[57] ABSTRACT

A fluorinated cation exchange membrane is formed using a copolymer of a fluorovinyl ether (I) having the formula

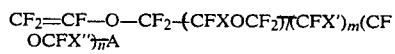

wherein l is 0 to 3; m is 2 to 6; n is 0 to 4 and one of l and n is not zero and $l+m+n \geq 3$; X, X' and X" are the same or different and each respectively represent —F or —CF$_3$; A represents —CN, —COF, —COOH, —COOR, —COOM or —CONR$_2$R$_3$; R$_1$ represents a C$_{1-10}$ alkyl group; and M represents an alkali metal or a quaternary ammonium salt; and a fluorinated olefin (II), or a hydrolyzed copolymer thereof. The fluorinated cation exchange membrane is used for production of a halogen and an alkali metal hydroxide by electrolysis of an alkali metal hydride.

16 Claims, No Drawings

FLUORINATED CATION EXCHANGE MEMBRANE AND USE THEREOF IN ELECTROLYSIS OF AN ALKALI METAL HALIDE

This application is a continuation-in-part of application Ser. No. 718,424, filed Aug. 22, 1976 and now abandoned.

BACKGROUND OF THE INVENTION

1. Field of the Invention:

The present invention relates to a novel fluorinated cation exchange membrane. More particularly, it relates to a fluorinated cation exchange membrane having an ion exchangable group which is effectively usable for diaphragmic electrolysis of an aqueous solution of electrolytes such as an alkali metal chloride.

2. Description of the Prior Art:

It has been known to produce alkali metal hydroxide in a catholyte compartment and chlorine in an anolyte compartment by partitioning the anolyte compartment and the catholyte compartment and electrolyzing an aqueous solution of alkali metal chloride fed therein. The method has been known as a diaphragmic electrolysis in two compartments. Heretofore, an asbestos diaphragm has been usually used in the method. When the asbestos diaphragm is used, the asbestos itself is corroded by the electrolyte. Accordingly, the asbestos diaphragm disadvantageously has a short lifetime because it is difficult to use it after longer times. In this method, the diaphragm has fine pores which pass the electrolyte whereby alkali metal chloride is incorporated in the resulting alkali metal hydroxide to cause low purity. When the concentration of alkali metal hydroxide is increased, the current efficiency is disadvantageously decreased.

In order to prolong the life of the diaphragm and to use it over a long time period, it has been proposed to coat the asbestos diaphragm with an alkali resistant florinated resin having a hydrophilic group or to form a diaphragm made of the alkali resistant florinated resin having the hydrophilic group (U.S. Pat. No. 3,853,720; U.S. Pat. No. 3,853,721). The diaphragm used in the latter method is also porous thereby passing the electrolyte. Accordingly, the purity of the alkali metal hydroxide obtained is relatively low. When the concentration of the alkali metal hydroxide is increased, it is difficult to prevent the current efficiency from decreasing. It has also been proposed to use a cation exchange membrane which does not substantially pass the electrolyte and selectively passes alkali metal ions as the diaphragm. It has been especially proposed to use a fluorinated cation exchange membrane having high alkali resistance and chlorine resistance (U.S. Pat. No. 3,773,634; U.S. Pat. No. 3,852,135). When such a cation exchange membrane is used as the diaphragm, the electrolyte is not substantially passed through it but only alkali metal ions are selectively passed through it, whereby the contamination of the alkali metal chloride in the resulting alkali metal hydroxide can be prevented to obtain a product having a satisfactory purity. However, there does not exist a cation exchange membrane having satisfactory current efficiency. Even the best known cation exchange membranes such as one made of a copolymer of $C_2F_4$ and $CF_2=CFOCF_2CF(CF_3)OCF_2CF_2SO_2F$ can not attain a current efficiency higher than 85% in a concentration of sodium hydroxide of higher than 20%, though the current efficiency may be higher when the concentration of sodium hydroxide is quite low. The current efficiency is decreased to lower than 70% when the concentration of sodium hydroxide is higher than 40%.

SUMMARY OF THE INVENTION

An object of the present invention is to provide a fluorinated cation exchange membrane which can be used as a diaphragm for producing a high purity alkali metal hydroxide in high concentration with high current efficiency in the diaphragmic electrolysis of an alkali metal chloride. Another object of the present invention is to provide a process and apparatus for electrolyzing an alkali metal halide by using the fluorinated cation exchange membrane.

The objects of the present invention have been attained by providing a fluorinated cation exchange membrane formed by a copolymer of a fluorovinyl ether (I) having the formula

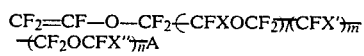

wherein l is 0 to 3; m is 2 to 6; n is 0 to 4 and one of l and n is not zero, and $l+m+n \geq 3$; X,X' and X" are the same or different and each respectively represents —F or —$CF_3$; A represents —CN, —COF, —COOH, —COOR, —COOM and —$CONR_2R_3$; $R_1$ represents a $C_{1-10}$ alkyl group, preferably a $C_{1-3}$ alkyl group; $R_2$ and $R_3$ each represent a hydrogen atom or a $C_{1-10}$ alkyl group and M represnets an alkali metal or a quaternary ammonium group; and a fluorinated olefin (II), or a hydrolyzed copolymer thereof, which has a pendant side chain having an ion exchange group such as a carboxylic acid group. The fluorinated cation exchange membrane is effective for use in diaphragm electrolysis of an aqueous solution of electrolyte such as an alkali metal chloride to produce an alkali metal and chloride, whereby excellent electrolytic characteristics are attained.

DETAILED DESCRIPTION OF THE PREFERRED EMBODIMENTS

It has been known to use a membrane formed by a copolymer of $C_2F_4$ and

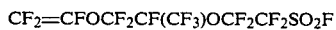

which is an analogous copolymer of the perfluorovinyl ether of the invention as a cation exchange membrane for diaphragmic electrolysis of an alkali metal chloride. However, the characteristics of such a membrane are not satisfactory, as stated above. However, when the cation exchange membrane formed by the copolymer of the invention is used, the current efficiency in the electrolysis remarkably increases to higher than 90% and a high current efficiency can be achieved even though the concentration of the alkali metal hydroxide is higher than 30%. This is an unexpected characteristic.

The fluorovinyl ethers (I) used in the fluorinated cation exchange membrane of the invention have the formula

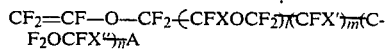

wherein l, m, n, X, X', X" and A are defined above. It is preferable that l=0 to 1; m=2 and n=0 to 1.

The definitions of l, m and n are important. When a compound having the formula out of the definitions of l, m and n is used, the characteristics of the membrane prepared by using the monomer are remarkably inferior to those of the membrane prepared by using the monomer having the formula wherein l, m and n are independently in said ranges. That is, the membrane prepared by using the monomer having the formula wherein m is less than 2 and $1+m+n \leq 2$ has shorter side chains for carboxylic acid groups whereby the cation exchange membrane obtained by using the monomer has inferior softness. During the uses, crackings are easily caused and a peeling phenomenon caused by a water swelling is also easily caused.

This fact may be understood from the fact stated in the below mentioned Reference 2 on the cation exchange membrane of the copolymer of $CF_2=CF_2$ and $CF_2=CF-O(CF_2)_3COOCH_3$.

Typical fluorovinyl ethers (I) include $CF_2=CFOCF_2CF(CF_3)OCF_2CF_2CF_2COOH_3$;

$CF_2=CFO(CF_2)_4OCFCOOCH_3$;
    |
    $CF_3$

On the other hand, the fluorinated olefins (II) used in the fluorinated cation exchange membrane of the invention have the formula $CF_2=CYY'$ wherein Y and Y' each respectively represent hydrogen, chlorine or fluorine or —$CF_3$. Typical fluorinated olefins include tetrafluoroethylene, trifluorochloroethylene, hexafluoropropylene, trifluoroethylene, vinylidenefluoride, etc. It is preferable to use a perfluoro compound especially tetrafluoroethylene. In the present invention, the content of the fluorovinyl ether (I) in the copolymer is important as it relates to the ion-exchange capacity of the resulting cation exchange membrane, and is in the range of 1 to 50 mole % preferably 2 to 40 mole %. When the content of the fluorovinyl ether (I) is too low, the ion-exchange function is low and the electric resistance is high. When the content of the fluorovinyl ether (I) is too high, the water content becomes high which decreases the strength of the membrane and the current efficiency. Accordingly, it is disadvantageous to use a content outside the above range. As stated above, the content of the fluorovinyl ether (I) in the copolymer relates to the ion-exchange capacity of the resulting cation exchange membrane. It is preferable to achieve an ion-exchange capacity in the resulting cation exchange membrane of 0.5-3.0, preferably 0.9 to 2, especially 1.12 to 1.8, milliequivalents per gram of dreid resin by choosing the content of the fluorovinyl ether (I) within said range. This ion-exchange capacity is quite different from those of the known cation exchange membranes formed by the analogous copolymers of $C_2F_4$ and $CF_2=CFOCF_2CF(CF_3)OCF_2CF_2SO_2F$, in order to achieve the desired characteristics such as current efficiency. This fact shows that the ion exchange membranes of the invention are different in quality.

In the preparation of the copolymers, it is possible to modify the copolymer by copolymerizing the two components (I) and (II) and another comonomer as a third component. These comonomers can be fluorovinyl ethers (III) having the formula $CF_2=CF-(OCF_2CFZ)_{l'}-(O)_{m'}-(CFZ')_{n'}-B$ wherein Z and Z' each respectively represent fluorine or a $C_{1-10}$ perfluoroalkyl group; l' is 0 to 3; m' is 0 to 12 and B represents —F, —H, —Cl, —$CHF_2$ or —$CF_3$, which have no ion-exchangable group and no functional group which can be converted to an ion-exchangable group. The copolymers produced by copolymerizing the fluorovinyl ether (III) have improved electrical properties and excellent flexibility without loss of softness in an aqueous solution of alkali metal hydroxide of high concentration during electrolysis of alkali metal chloride, and the like, and with less formation of creases caused by wrinkling. It is especially preferable to use the fluorovinyl ether (III) wherein Z is F or —$CF_3$; Z' is —F; l is 0 to 1; m is 0 to 1; n is 0 to 8; and B is —F. Typical fluorovinyl ethers (III) include perfluoromethyl vinyl ether, perfluoropropyl vinyl ether; 3,6-dioxane-4-methyl-7-octene, and the like. The content of the fluorovinyl ether (III) in the copolymer is preferably in the range of from 1 to 50 mole % especially 2 to 40 mole %.

Other comonomers suitable for use as the third component include fluorinated monomers (IV) which introduce a C atom-hetero atom bond in the main chain of the copolymer obtained. Such fluorinated monomers (IV) include fluoroketones having the formula $$D-CF_2-\overset{O}{\underset{\|}{C}}-CF_2-D'$$

wherein D and D' each respectively represent hydrogen, fluorine, chlorine, a perfluoroalkyl group, an ω-hydroperfluoroalkyl group, an ω-chloroperfluoroalkyl group or an ω-alkoxyperfluoroalkyl group; fluoronitroso compounds having the formula $D-CF_2-N=O$ and the fluorothiocarbonyl compounds having the formula $$\begin{array}{c} D-CF_2 \\ \phantom{D-CF_2}\diagdown \\ \phantom{D-CF_2000}C=S \\ \phantom{D-CF_2}\diagup \\ D-CF_2 \end{array}$$

The nitroso compound, etc. is copolymerized with tetrafluoroethylene to form a structure of $$\begin{array}{ccccccc} F & F & CF_2-D & F & F \\ | & | & | & & | & | \\ -C-C-N&-&-O-C-C- \\ | & | & & & | & | \\ F & F & & & F & F \end{array}$$

in the main chain, whereby the C-different atom bond, such as C—N or C—O, can be introduced in the chain. When the fluorinated monomer (IV) is copolymerized, similar characteristics to those resulting using the copolymers formed by adding the fluorovinyl ether (III) can be achieved. The content of the fluorinated monomer (IV) is as that of the fluorovinyl ether (III).

Other comonomers used as the third component include divinyl monomers such as $$CF_2=CF—CF=CF_2 \text{ or}$$

$$CF_2=CFO(CF_2)_{1-12}OCF=CF_2.$$

Cross-linked copolymers can be formed by adding the divinyl monomer. The copolymers of the invention can be produced by conventional methods with or without using an inert organic solvent or an aqueous solvent under the action of a polymerization initiating source such as a peroxide compound, an azo compound, ultraviolet radiation or ionized high energy radiation, etc. (U.S. Pat. No. 3,536,733; OLS No. 2052495 (West Germany) U.S. Pat. No. 3,642,742). Suitable polymerization methods include conventional ones such as bulk polymerization, solution polymerization, and suspension polymerization. The fluorinated copolymers of the invention can be graft copolymers, and block copolymers as well as random copolymers. It is preferable to use the copolymers produced by directly copolymerizing the above-mentioned monomers from the viewpoint of the formation of a cation exchange membrane having uniform ion-exchange capacity in which the ion exchangable groups are uniformly distributed. The molecular weight of the copolymer of the invention is in the range of about 3,000 to 300,000, preferably 10,000 to 100,000.

Suitable methods of forming membranes by using the fluorinated copolymer of the invention, include known methods such as press molding, roll molding, extrusion molding, solution flow-spreading, dispersion molding and powder molding. The membrane can be formed by any of these methods. It is necessary to form a non-porous membrane because the membrane should not substantially pass the electrolyte such as an alkali metal chloride and should selectively pass only specific ions. From this viewpoint, it is preferable to impart a water passing rate to the membrane of less than 100 ml/hour/m$^2$, especially less than 10 ml/hour/m$^2$, under a pressure of water of 1m, at 60° C. in 4N-NaCl having a pH of 10. The thickness of the membrane should be in the range of 20 to 500, preferably 50 to 300, micrometers.

Before or after the formation of the membrane from the copolymer, preferably after the formation of the membrane, it is possible to introduce carboxylic acid groups by converting the functional groups by treatment of copolymers whose functional groups are not carboxylic acid groups. For example, when the copolymers have functional groups of —CN, —COF, —COOR$_1$, —COOM, —CON$_2$N$_3$, (M and R$_1$ to R$_3$ are defined above), the copolymers can be treated with an alcoholic solution of an acid or alkali to hydrolyze or to neutralize it, to form a carboxylic acid. The fluorinated copolymer can be blended with a polyolefin such as polyethylene, polypropylene, a fluorinated polymer such as polytetrafluoroethylene, a copolymer of ethylene and tetrafluoroethylene before molding it. It is also possible to reinforce the membrane by supporting the fluorinated copolymer on a support of a fabric, e.g., cloth, net and non-woven fabric, or a porous film which is made of the polymer. When the polymer is blended or the support is used, the amount of the resin of the polymer or the support is not considered in the calculation of the ion-exchange capacity.

The known diaphragmatic electrolyzing methods can be applied in producing an alkali hydroxide using the cation exchange membrane by the electrolysis of an alkali chloride. For example, the electrolytic voltage and the current density are preferably 2.3 to 5.5 volts, and 5 to 100 A/dm$^2$, respectively. The anode used in the electrolysis can be an anticorrosive electrode having size stability which is made of graphite or a titanium substrate coated with a platinum group metal or an oxide of a platinum group metal. The electrolyte cell system can be unipolar or multipolar. Thus, in the case of the two compartment cell wherein the anolyte compartment and the catholyte compartment are formed by partitioning the anode and the cathode with the cation exchange membrane, and an aqueous solution of alkali metal chloride is fed into the anolyte compartment to electrolyze it to obtain an alkali metal hydroxide from the catholyte compartment, it is possible to produce sodium hydroxide having a high concentration of greater than 40%, with high current efficiency of higher than 90% by electrolyzing an aqueous solution of sodium chloride having a concentration of higher than 2N at from 40 to 100° C., preferably 50 to 90° C., using a current density of 5 to 50 A/dm$^2$. The process of the invention is not limited to the two compartment cell system, and can be attained by using a three compartment cell wherein an anolyte compartment, a catholyte compartment and a middle compartment are formed by partitioning the anode and the cathode by using a plurality of cation exchange membranes or combinations with other cation exchange membranes or other diaphragms. A cell having more than three compartments can also be used. The fluorinated cation exchange membranes of the invention have excellent characteristics for the electrolysis of an alkali metal chloride and they can be used in various fields such as for diaphragms for electrolytic reduction, fuel cells, electrodialysis or diffusion dialysis especially where the use requires an anticorrosive membrane.

A further understanding can be obtained by reference to certain specific examples which are provided herein for purposes of illustration only and are not intended to be limiting unless otherwise specified. In the examples, the ion-exchange capacity of a cation exchange membrane is measured as follows. An H-type cation exchange membrane is immersed into 1N-HCl at 60° C. for 5 hours to completely convert it to an H-type membrane, and then the membrane is washed with water to be free of HCl. Then, 0.5 g of the H-type membrane is immersed into a solution prepared by adding 25 ml of water to 25 ml of 0.1N-NaOH to completely convert it to a Na$^+$ type membrane. Then the membrane is taken out and the amount of NaOH in the solution is measured by back titration with 0.1N-HCl.

EXAMPLE 1

Methyl (3-fluorocarbonyl) tetrafluoropropionate having a boiling point of 80° to 82° C. which was produced by reacting perfluoro-γ-butyrolactone with an equimolar amount of methanol was charged into a reactor containing CsF. Hexafluoropropyleneoxide was charged into it at a temperature of 0° to 10° C. in a concentration of 2.5 molar equivalents to the tetrafluoropropionate. After the reaction, a hexafluoropropyleneoxide adduct (2 mole) having the formula $$\begin{array}{c} FOCCFOCF_2Cf(CF_3)O(CF_2)_3COOCH_3 \\ | \\ CF_3 \end{array}$$

was separated by distillation as a fraction of boiling point of 70° to 75° C./10 mmHg. The hexafluoropropyleneoxide adduct was added dropwise at 80° C. to a reactor containing a dispersion of $Na_2CO_3$. After the generation of carbon dioxide gas was stopped, the object compound having the formula $$CF_2=CFOCF_2CF(CF_3)O(CF_2)_3COOCH_3$$

was separated by distillation as a fraction of boiling point of 63° to 67° C./7 mmHg. The product was confirmed by 19F NMR. The resulting compound and trichlorotrifluoroethane and azobisisobutyronitrile as a catalyst were charged into a 200 ml autoclave made of stainless steel. The autoclave was purged with nitrogen and heated at 70° C. and tetrafluoroethylene was fed into it to react the contents for 18 hours, whereby the copolymer of $C_2F_4$ and $$CF_2=CFOCF_2CF(CF_3)O(CF_2)_3COOCH_3$$

was obtained. The copolymer was pressed at 200° C. to form a film having a thickness of 150 micrometers and was hydrolyzed to obtain a cation exchange membrane having an ion-exchange capacity of 0.95 meq/g polymer. The water permeating rate of the membrane was 3.3 ml/hour/m$^2$ under a pressure of 1 mH$_2$O (at 60° C. in 4N-NaCl having a pH of 10). A two compartment type electrolytic cell was prepared by using the fluorinated cation exchange membrane for the partition of an anode and a cathode. The anode was made of a titanium substrate coated with rhodium and the cathode was made of stainless steel. The gap between the anode and the cathode was 2.2 cm and the effective area of the membrane was 25 cm$^2$. An electrolysis of sodium chloride was carried out under the following conditions. The anolyte compartment was filled with 4N-NaCl aq. solution and the cathode compartment was filled with 8N-NaOH aq. solution. 4N-NaCl aq. solution was continuously fed into the anolyte compartment at a rate of 150 cc/hour and 0.1N-NaOH aq. solution was continuously fed into the catholyte compartment. The cell voltage was 4.28 volts; the current density was 20A/dm$^2$. The temperature of the solution was 92° C. and the pH of the anolyte solution was 3. The aqueous solution of sodium chloride was overflown from the anolyte compartment; the aqueous solution of sodium hydroxide overflown from the catholyte compartment was collected; and the current efficiency was measured from the amount of sodium hydroxide collected. As a result, an aqueous solution of sodium hydroxide having a concentration of 13.0 Normal was obtained at a current efficiency of 93.3%. The content of sodium chloride in the resulting sodium hydroxide was less than 0.1%.

REFERENCE 1

The electrolysis of sodium chloride was repeated under the same conditions except using a cation exchange membrane formed by a copolymer of $C_2F_4$ and $CF_2=CFOCF_2CF(CF_3)OCF_2CF_2SO_2F$ having an ion-exchange capacity of 0.83 meq/g polymer (manufactured by DuPont; trade name of Nafion 124). The current efficiency was 60% to obtain an aqueous solution of sodium hydroxide having the same concentration.

REFERENCE 2

In accordance with the process of Example 1 except using a cation exchange membrane which was prepared by hydrolyzing a film of a copolymer of $C_2F_4$ and $CF_2=CFO(CF_2)_3COOCH_3$ having 190° C. of the temperature for the volumetric melt flow rate of 100 mm$^3$/second and 22° C. of the glass transition temperature which had a thickness of 150 microns and an ion-exchange capacity of 1.20 meq/g dry polymer, the electrolysis of sodium chloride was carried out.

As the result, 13.0 NaOH was obtained from the cathode compartment in a current efficiency of 92%. The current efficiency was decreased for about 3% and the peeling-off phenomenon with many blisters in the membrane was found after using the membrane for 3 months.

EXAMPLE 2

In a 200 ml autoclave made of stainless steel, 31.5 g of $$CF_2=CFOCF_2CF(CF_3)O(CF_2)_3COOCH_3,$$

4.5 g of $CF_2=CFOC_3F_7$, 18 g of trichlorotrifluoroethane and 76 mg of azobisisobutyronitrile were charged. The autoclave was purged with nitrogen and heated at 70° C. and tetrafluoroethylene was fed to a concentration of 16.5 Kg/cm$^2$ to react for 20 hours, whereby 10.3 g of a copolymer was obtained. The copolymer was pressed at 180° C. to form a film having a thickness of 150 micrometers and was hyrdolyzed to obtain a cation exchange membrane having an ion-exchange capacity of 0.80 meq/g polymer. In accordance with the process of Example 1 except using the fluorinated cation exchange membrane, the electrolysis of sodium chloride was carried out. A current efficiency of 93% was obtained for producing an aqueous solution of sodium hydroxide having a concentration of 13 Normal. The membrane was bent at 180 degrees and was immersed at 90° C. for 24 hours in 13N-NaOH aq. solution. However, its flexibility was maintained and unrecoverable creases were not achieved.

EXAMPLE 3

In accordance with the process of Example 3 except using 6.4 g of $$CF_2=CFOCF_2CFOCF_2CF_3$$
$$\phantom{CF_2=CFOCF_2}|$$
$$\phantom{CF_2=CFOCF_2CF}CF_3$$

instead of $CF_2=CFOC_3F_7$, the copolymerization was carried out for 20 hours to obtain 10.5 g of a copolymer. A cation exchange membrane having an ion-exchange capacity of 0.93 meq/g polymer was obtained by using the copolymer. In accordance with the process of Example 1 except using the membrane, the electrolysis of sodium chloride was carried out. The current efficiency of 92% was obtained for producing an aqueous solution of sodium hydroxide having a concentration of 13 Normal. In the test involving immersing the membrane in 13N-NaOH aq. solution as in Example 3, unrecoverable creases were not achieved.

EXAMPLE 4

In a 200 ml autoclave made of stainless steel, 31.5 g of $$CF_2=CFOCF_2CF(CF_3)O(CF_2)_3COOCH_3,$$

20 g of trichlorofluoroethane and 80 mg of azobisisobutyronitrile were charged. The autoclave was purged with nitrogen, heated at 70° C. and perfluoroacetone was charged into the autoclave to a concentration of 3 KG/cm². Then, tetrafluoroethylene was charged to a concentration of 17.5 Kg/cm² to react for 20 hours whereby 9.7 g of a copolymer was obtained. The copolymer was pressed at 180° C. to form a film having a thickness of 150 micrometers and was hydrolyzed to obtain a cation exchange membrane having an anion-exchange capacity of 0.82 meq/g polymer. In accordance with the process of Example 1 except using the cation exchange membrane, the electrolysis of sodium chloride was carried out to obtain a current efficiency of 93% for producing 13N-NaOH aq. solution. In the test involving immersing the membrane in 13N-NaOH aq. solution as in Example 3, the flexibility was maintained and unrecoverable creases were not achieved.

EXAMPLE 5

In accordance with the process of Example 5 except charging trifluoronitrosomethane to a concentration of 3.0 Kg/cm² instead of perfluoroacetone, the copolymerization was carried out for 20 hours to obtain 8.9 g of a copolymer. A cation exchange membrane having an ion-exchange capacity of 0.98 meq/g polymer was obtained from the copolymer. In accordance with the process of Example 1 except using the cation exchange membrane, the electrolysis of sodium chloride was carried out to obtain a current efficiency of 91% for producing 13N-NaOH aq. solution. In the test involving immersing the membrane in 13NaOH aq. solution as in Example 3, the flexibility was maintained and unrecoverable creases were not achieved.

What is claimed is

1. A fluorinated cation exchange membrane comprising a copolymer of fluorovinyl ether (I) or a hydrolyzed copolymer thereof having the formula $$CF_2=CF-O-CF_2-CFXOCF_2)_l(CFX')_m(CF_2OCFX'')_n A$$

wherein l is 0 to 3; m is 2 to 6; m is 0 to 4 and one of l and n is not zero; X,X' and X'' are the same or different and each respectively is —F, or —CF₃; A is —CN, —COF, —COOH, —COOR, —COOM or CONR₂R₃; R₁ is a C₁₋₁₀ alkyl group; R₂ and R₃ each respectively is hydrogen or a C₁₋₁₀ alkyl group; and M is an alkali metal or a quaternary ammonium salt; and a fluorinated olefin (II).

2. The fluorinated cation exchange membrane of claim 1, wherein the membrane comprises a copolymer of the fluorovinyl ether (I), the fluorinated olefin (II) and a fluorovinyl ether (III) having the formula $$CF_2=CF-(OCF_2CFZ)_{l'}-(O)_{m'}-(CFZ')_{n'}B$$

wherein Z and Z' each respectively is F or a C₁₋₁₀ perfluoroalkyl group; l' is 0 to 3; m' is 0 to 12; n' is 0 to 12; and B is —H, —F, —Cl, —CHF₂ or —CF₃, which ether (III) has no ion-exchangable groups and no functional groups which can be converted to an ion-exchangable group; or a hydrolyzed copolymer thereof.

3. The fluorinated cation exchange membrane of claim 2, wherein the fluorovinyl ether (III) is perfluoromethyl vinyl ether, perfluoropropyl vinyl ether or 3,6-dioxane-4-methyl-7-octene.

4. The fluorinated cation exchange membrane of claim 2, wherein the content of the fluorovinyl ether (III) in the copolymer is in the range of 1 to 30 mole %.

5. The fluorinated cation exchange membrane of claim 1, wherein the membrane comprises the copolymer of the fluorovinyl ether (I) and the fluorinated olefin (II) and a fluorinated monomer (IV) which introduces carbon atom-different atom bonds in the main chain of the copolymer; or a hydrolyzed copolymer thereof.

6. The fluorinated cation exchange membrane of claim 5, wherein the fluorinated monomer (IV) is a fluoroketone having the formula

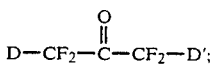

a fluoronitrile having the formula

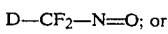

a fluorothiocarbonyl compound having the formula

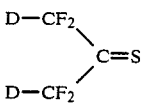

wherein D and D' each respectively is a perfluoroalkyl, ω-hydroperfluoroalkyl, ω-chloroperfluoroalkyl or ω-alkoxyperfluoroalkyl group.

7. The fluorinated cation exchange membrane of claim 5, wherein the content of the fluorinated monomer (III) in the copolymer is in the range of 1 to 40 mole %.

8. The fluorinated cation exchange membrane of claim 1, wherein the fluorinated olefin (II) is a compound having the formula $$CF_2=CYY'$$

wherein Y and Y' each respectively is —H, —Cl, —F or —CF₃.

9. The fluorinated cation exchange membrane of claim 1, wherein the content of the fluorovinyl ether (I) in the copolymer is in the range of 1 to 50 mole %.

10. The fluorinated cation exchange membrane of claim 1, wherein the ion exchange capacity of the membrane is in the range of 0.5 to 3.0 milliequivalents per gram of dried resin.

11. The fluorinated cation exchange membrane of claim 1, wherein the fluorovinyl ether (I) is $$CF_2=CFOCF_2CF(CF_2)O(CF_2)_3COOCH_3.$$

12. The fluorinated cation exchange membrane of claim 1, wherein the fluorinated olefin (II) is tetrafluoroethylene or trifluorochloroethylene.

13. In a process for producing a halogen and an alkali metal hydroxide by electrolysis of an alkali metal halide employing separate anode and cathode sections in an electrolytic cell, the improvement which comprises passing ions of said alkali metal through the fluorinated cation exchange membrane of claim 1.

14. An electrolytic cell comprising a housing with separate anode and cathode sections, said sections being separated by the fluorinated cation exchange membrane of claim 1.

15. A cation exchange membrane which is suitable for use in the electrolysis of an aqueous sodium chloride solution, said membrane having been formed from a copolymer of a fluorovinyl ether (I) or a hydrolyzed copolymer thereof having the formula:

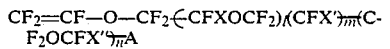

wherein l is 0 to 3; m is 2 to 6; n is 0 to 4 and one of l and n is not zero; X, X' and X'' are the same or different and each respectively is —F, or —$CF_3$; A is —CN, —COF, —COOH, —COOR, —COOM or —$CONR_2R_3$; $R_1$ is a $C_{1-10}$ alkyl group; $R_2$ and $R_3$ each respectively is hydrogen or a $C_{1-10}$ alkyl group; and M is an alkali metal or a quaternary ammonium salt; and a fluorinated olefin (II); said membrane having an ion-exchange capacity of carboxylic acid groups of from 0.5 to 3.0 milliequivalents per gram of dry resin.

16. A process for the electrolysis of a 4N aqueous sodium chloride solution to produce 13N sodium hydroxide with increased current efficiency which comprises passing an electric current through said solution and an electrolytic cell separated into an anode chamber and a cathode chamber by cation exchange membrane formed from a copolymer of a hydrolyzed copolymer of $C_2F_4$, $CF_2$=$CFOC_3F_7$ and

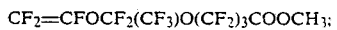

said membrane having an ion-exchange capacity of carboxylic acid groups of 0.80 milliequivalents per gram of dry resin.

* * * * *